US005742423A

United States Patent [19]
Ido et al.

[11] Patent Number: 5,742,423
[45] Date of Patent: Apr. 21, 1998

[54] SEMICONDUCTOR OPTICAL MODULATOR

[75] Inventors: Tatemi Ido, Hachioji; Hirohisa Sano, Niiza, both of Japan

[73] Assignee: Hitachi, Ltd., Tokyo, Japan

[21] Appl. No.: 390,794

[22] Filed: Feb. 17, 1995

[30] Foreign Application Priority Data

Feb. 18, 1994 [JP] Japan ................................ 6-020876

[51] Int. Cl.$^6$ .................. G02F 1/025; G02B 6/13
[52] U.S. Cl. .................. 359/254; 359/163; 359/248; 385/3; 385/8
[58] Field of Search .................. 359/163, 183, 359/248, 254, 279; 385/2, 3, 8

[56] References Cited

U.S. PATENT DOCUMENTS

| | | | |
|---|---|---|---|
| 4,802,182 | 1/1989 | Thornton et al. | 372/46 |
| 5,165,105 | 11/1992 | Haase et al. | 385/8 |
| 5,222,162 | 6/1993 | Yap et al. | 385/14 |
| 5,339,370 | 8/1994 | Sano et al. | 359/278 |
| 5,347,601 | 9/1994 | Ade et al. | 385/3 |
| 5,359,679 | 10/1994 | Tanaka et al. | 359/248 |

FOREIGN PATENT DOCUMENTS

| | | |
|---|---|---|
| 672932 | 9/1995 | European Pat. Off. . |
| 3293622 | 12/1991 | Japan . |

OTHER PUBLICATIONS

Shimegu et al., Technical Report of IEICE, EDM93-33, CMP93-44.OQB93-67 (1993-08).
Electroabsorption Modulator Module, by: Shimizu, et al, pp. 55-60.

Patent Abstracts of Japan, vol. 014 No. 267 (p. 1058), 8 Jun. 1990 & JP-A-02 074918.

NEC Research and Development, Jul. 1992, Japan, vol. 33, No. 3, pp. 372-382, Sasaki, et al.

Microwave and Optical Technology Letters, 20 Feb. 19094, vol. 7, No. 3, pp. 132-139, Aoki M et al.

IEEE Photonics Technology Letters, Feb. 1995, vol. 7, No. 2, pp. 170-172, Ido T et al.

Patent Abstracts of Japan, vol. 017, No. 313, Jun. 15, 1993, & JP-A-05 029602.

Technical Report Of IEICE, vol. 93, No. 199, Aug. 1993, pp. 55-60, Shimizu H et al.

*Primary Examiner*—Nelson Moskowitz
*Attorney, Agent, or Firm*—Antonelli, Terry, Stout & Kraus, LLP.

[57] ABSTRACT

A passive region is provided on one side or both sides of a waveguide-type optical modulator. Thereby, it is possible to obtain a high-speed optical modulator package superior in mechanical strength, thermal characteristic, high-frequency characteristic, and extinction characteristic. Moreover, it is possible to increase the operating speed of an optical fiber transmission equipment by applying the optical modulator package to the optical fiber transmission equipment.

29 Claims, 6 Drawing Sheets

MODULATION REGION | PROPAGATION REGION

MODULATION REGION | PROPAGATION REGION

SEMICONDUCTOR OPTICAL MODULATOR

BACKGROUND OF THE INVENTION

The present invention relates to a semiconductor optical modulator, an optical modulator package using the semiconductor optical modulator, and an optical fiber transmission equipment.

To increase the capacity of an optical fiber transmission equipment, it is necessary to realize higher-speed light modulation. An optical modulator using the electric field effect of semiconductor can operate at a high-speed, high-efficiency light modulation. Therefore, it has been studied how to increase the operating speed of the modulator and to package the modulator in order to apply the modulator to optical fiber transmission equipment.

FIGS. 1A to 1C show a conventional electro-absorption optical modulator which is one type of semiconductor optical modulator. In FIGS. 1A to 1C, numeral 1 denotes an n-doped semiconductor wafer, 2 denotes an n-doped buffer layer, 3 denotes an undoped light absorption layer, 4 denotes a p-doped cladding layer, 5 denotes a contact layer, 6 denotes an optical waveguide, 7 denotes an insulator, 8 denotes a p electrode, 9 denotes an n electrode, and 10 denotes an anti-reflection coat. In this modulator, light enters the optical waveguide from an element facet and is propagated through the optical waveguide, and thereafter it is emitted from the opposite facet. The optical waveguide has the light absorption layer 3, and light is modulated by applying an electric field to the light absorption layer by use of electrodes and by changing the absorption intensity. By adopting a multiple-quantum well structure in the light absorption layer 3 so as to utilize the electro-absorption effect, an optical modulator with a higher efficiency is obtained.

FIGS. 2A, 2B, and 2C show an optical modulator package using the above semiconductor optical modulator. In FIGS. 2A, 2B, and 2C, numeral 21 denotes a package body, 22 denotes a polarization holding fiber, 23 denotes a carrier, 24 denotes an unspherical lens, 251 and 252 denotes microstrip lines, 26 denotes an optical modulator, 27 denotes a matching resistor, 281 and 282 represent wire bonds, 29 denotes input/output terminal pins, 30 denotes a rod lens, 31 denotes an electronic cooling device, and 32 denotes a package cover. In the modulator package, optical coupling of the input/output optical fiber 22 and the optical modulator 26 is achieved by the rod lens 30 and unspherical lens 24. The element is mounted on the carrier 32 having a protrusion with a width (W) approximately equal to the modulator length (L) so that light is not scattered between the modulator 26 and the unspherical lens 24. An electrical signal is fed to the modulator through the microstrip line 251, and moreover, the matching resistor 27 for avoiding reflection of the signal is provided at the end of the strip line 251. This type of package is described in, for example, the TECHNICAL REPORT OF IEICE, EMD 93-33, CPM 93-46, OQE 93-67 (1993-08), pp. 55–60.

The modulation speed of the above optical modulator is limited by the element capacitance. Therefore, to obtain a higher-speed optical modulator, it is necessary to decrease the element capacitance by decreasing the modulator length (L).

However, when decreasing the device length (L) of a conventional optical modulator and optical modulator package in order to increase the operation speed, it is necessary to also decrease the width (W) of the protrusion of a carrier in order to avoid scattering of light. However, if the width (W) of the carrier protrusion is decreased, a problem arises that the mechanical strength of the protrusion is decreased or heat conduction becomes low. Moreover, it is necessary to decrease the microstrip line 251 and the matching resistor 27 in size provided on the same protrusion, otherwise a problem will arise that the high frequency characteristics of the strip line and the withstand voltage of the matching resistor will be impaired. Furthermore, when the element has a length of 300 μm or less, the light not coupled with the optical waveguide at the incidence facet of the modulator is propagated through the part above the optical modulator or within the wafer of the optical modulator and coupled with an optical fiber on the output side. The uncoupled light impairs the extinction characteristics of the package or makes the adjustment of the optical system difficult.

SUMMARY OF THE INVENTION

It is an object of the present invention to provide a high-speed semiconductor optical modulator suitable for packaging, an optical modulator package using the optical modulator, and optical fiber transmission equipment.

The above object is achieved by forming a passive region on one side or both sides of a modulation region for modulating light in a waveguide-type semiconductor modulator, and by forming at least part of a cladding layer in the passive region from an undoped or semi-insulating semiconductor or electrically isolating the cladding layer in the passive region from the cladding layer in the passive region.

Functions of the optical modulator according to the invention will be described below, referring to FIGS. 3A to 3C. In FIGS. 3A to 3C, numeral 41 denotes an n-InP wafer, 42 denotes an n-InAlAs buffer layer, 43 denotes an undoped InGaAs/InAlAs strained multiple-quantum well layer, 44 denotes a p-InAlAs cladding layer, 45 denotes a p+-InGaAs contact layer, 46 denotes an SiO$_2$ mask, 47 denotes an undoped InP buffer layer, 48 denotes an undoped InGaAsP core layer, 49 denotes an undoped. InP cladding layer, 50 denotes an optical waveguide, 51 denotes polyimide, 52 denotes a Cr/Au p-electrode, 53 denotes an AuGeNi n-electrode, and 54 denotes an SiNx anti-reflection coat. In this modulator, the optical waveguide structure comprises a modulation region (length of L$_2$) for modulating light and two passive regions (lengths of L$_1$ and L$_3$) for coupling the modulation region with the element facets. The band gap energy of the semiconductor constituting the optical waveguide in the passive region is sufficiently larger than the light energy, and the light is propagated in these regions with a low loss. The light entering through a facet is propagated through the one passive region, modulated in the modulation regions, propagated through the other passive region again, and emitted outside. Because the cladding layer 49 in the passive region is formed of undoped or semi-insulating semiconductor, the element capacitance is not increased even when the passive regions are provided. Therefore, in this optical modulator, it is possible to easily provide a high speed device by decreasing the modulation-region length (L$_2$) even though the overall device length (L=L$_1$+L$_2$+L$_3$) is long. Moreover, in the case of an optical modulation package using this high speed modulator, it is possible to increase the carrier protrusion width (W) almost up to the overall element length (L). Therefore, by using this modulator, it is possible to provide a high-speed optical modulator package superior in mechanical strength, thermal characteristics, high-frequency characteristics, and extinction characteristics.

The device has been described above in which optical waveguides are provided on both sides of a modulation region. However, it should be noted that the same effect can be expected by forming an optical waveguide on only one side of the modulation region. Moreover, though the method for insulating the whole of the cladding layer 49 in the passive region has been described above, completely the stone effect can be expected by forming high-resistance regions between the passive regions and the modulation region to electrically isolate the cladding layers in both regions from each other, even if the cladding layers in the passive regions are conductive.

DESCRIPTION OF THE PREFERRED EMBODIMENTS

Figure 1A:
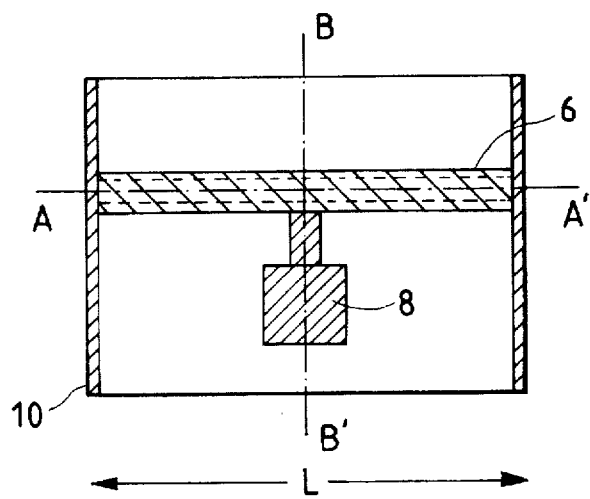
FIG. 1A is a top view of a conventional semiconductor optical modulator.
Figure 1C:
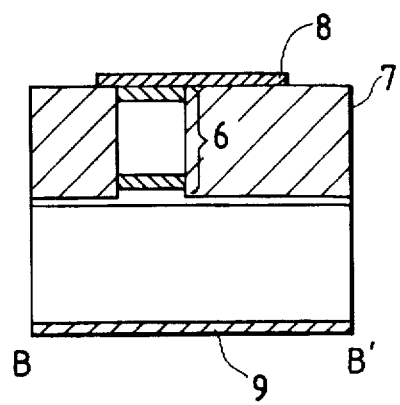
FIG. 1C is a sectional view along the line B—B' of FIG. 1A.
Figure 1B:
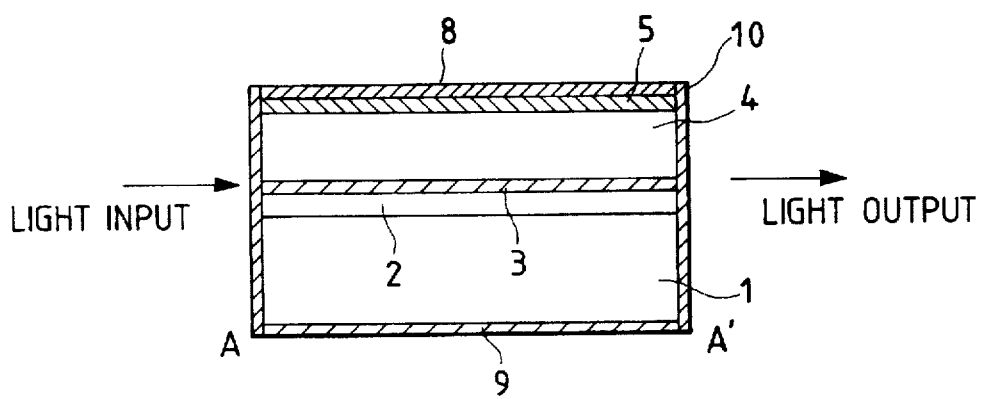
FIG. 1B is a sectional view along the line A—A' of FIG. 1A.
Figure 3A:
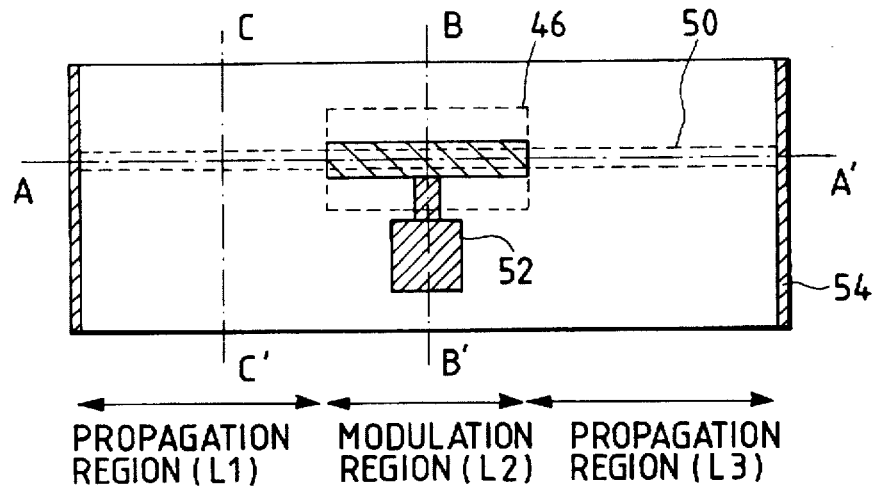
FIG. 3A is a top view of embodiment of the optical modulator of the present invention.
Figure 3B:
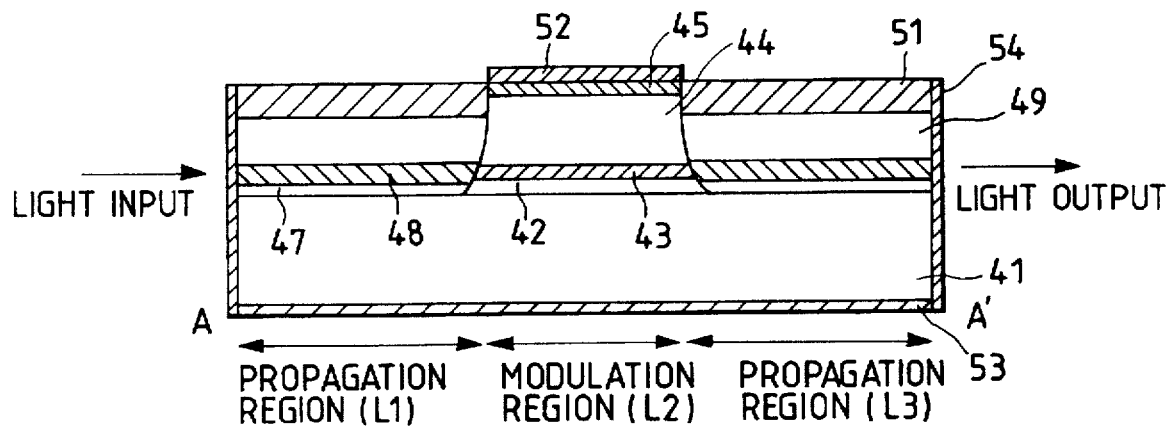
FIG. 3B is a sectional view along the line A—A' of FIG. 3A.
Figure 3C:
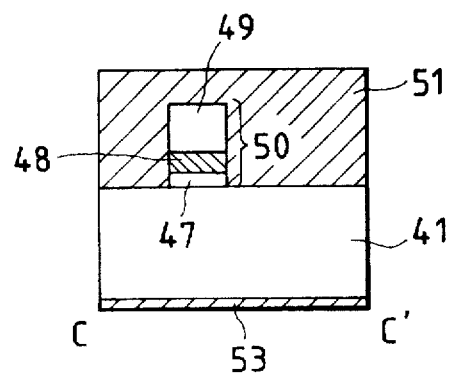
FIG. 3C is a sectional view along the line C—C' of FIG. 3A.

FIG. 3A is a diagram showing a top view of the optical modulator of embodiment of the optical modulators of the present invention, FIG. 3B is a sectional view along the line A—A' of FIG. 3A, and FIG. 3C is a sectional view taken along the line C—C' of FIG. 3A. The B—B+ cross section in FIG. 3A is the same as that in FIG. 1C. Numeral 46 in FIG. 3A denotes an SiO2 mask used for etching and the second crystal growth.

The n-In$_{0.53}$Al$_{0.47}$As buffer layer 42 (0.2 μm), undoped In$_{0.48}$Ga$_{0.52}$As/In$_{0.60}$Al$_{0.40}$As strained multiple-quantum well layer 43 (well layer: 7 nm, barrier layer: 5 nm, number of wells: 10, and band gap wavelength: 1.49 μm), p-In$_{0.53}$Al$_{0.47}$As cladding layer 44 (2.0 μm), and p+-In$_{0.53}$Ga$_{0.47}$As contact layer 45 (0.2 μm) were formed in order on the n-InP wafer 41 by an MBE (Molecular Beam Epitaxy) technique. Then, the MBE growth layer in the region other than the SiO$_2$ mask 46 was removed by selective wet etching using the SiO$_2$ mask 46. Then, the undoped InP buffer layer 47 (0.15 μm), undoped In$_{0.82}$Ga$_{0.18}$As$_{0.40}$P$_{0.60}$ core layer 48 (0.2 μm), and undoped InP cladding layer 49 (1.5 μm) were grown in the region other than the SiO2 mask 46 by MOCVD (Metal Organic Chemical Vapor Deposition). After the SiO$_2$ mask is removed, mesa-etching up to an InP wafer was performed by dry-etching to form an optical waveguide 50 (waveguide width of 3 μm). After the element surface was planarized by polyimide 51, the Cr/Au p-electrode 52 was formed. After the AuGeNi n-electrode 53 is formed by vacuum-evaporation, the element is cleaved, and SiNx anti-reflect/on coats 54 are formed on both facets. The element had a length of 1,000 μm, the modulation region had a length (L$_1$) of 100 μm, and the element had a capacitance of 0.3 pF.

Figure 2A:
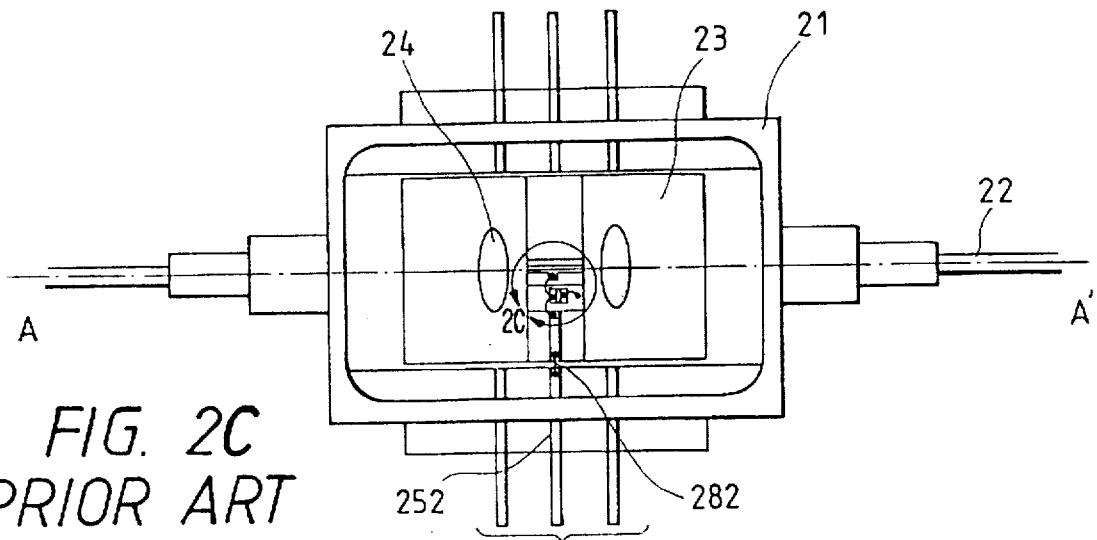
FIG. 2A is a top view of a conventional semiconductor optical modulator package (however, the package cover is removed)
Figure 2C:
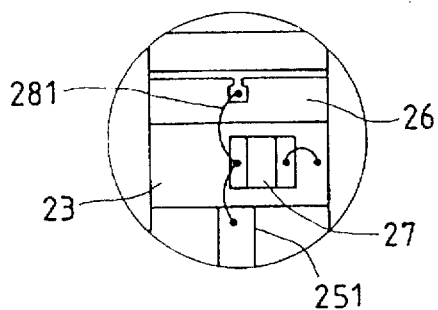
FIG. 2C is an enlarged view of a portion of the conventional semiconductor optical modulator package shown in FIG. 2A.
Figure 2B:
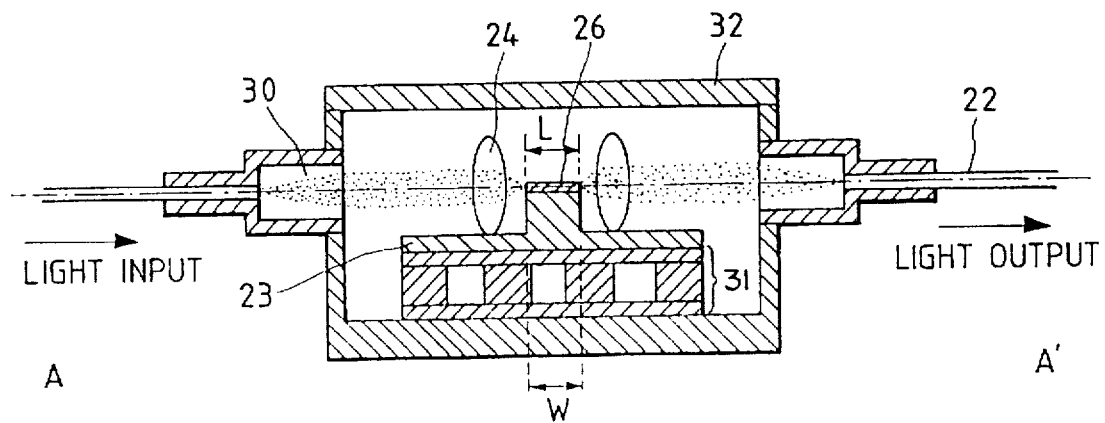
FIG. 2B is a sectional view along the line A—A' of FIG. 2A (the light propagation state is also shown)

The optical modulator package shown in FIGS. 2A and 2B similar to a conventional one was fabricated using the thus obtained modulator. In the case of this modulator package, the carrier protrusion width (W) was 1,000 μm. A semiconductor laser beam of 1.55 μm was applied to the obtained optical modulator package to measure the modulation characteristics. In this measurement, the incidence polarization was adjusted so that the light in the modulator was propagated in the TE mode. The insertion loss in the state that no voltage was applied to the modulator (light output is ON) was 9 dB and the voltage necessary for 15-dB extinction was 1.5 V. The modulation band width ($f_{3dB}$) of the optical modulator package was 20 GHz.

Figure 6:
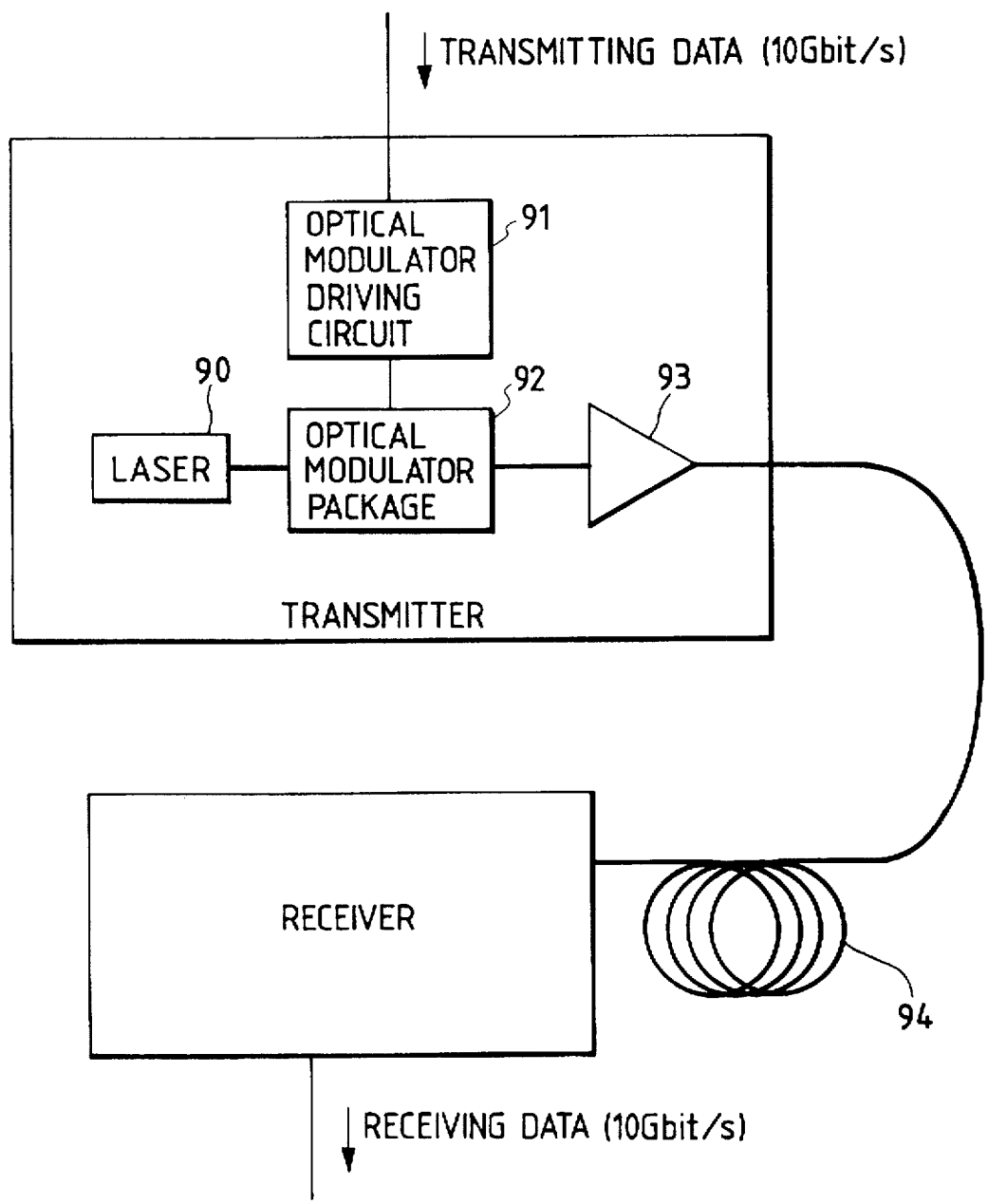
FIG. 6 is an illustration showing the optical modulator of the present invention and an optical fiber transmission equipment using the optical modulator.

An optical fiber transmission equipment (transmission rate of 10 Gbits/s) shown in FIG. 6 was manufactured using the obtained optical modulator package. In FIG. 6, numeral 90 denotes a 1.55-μm DFB laser, 91 denotes an optical modulator driving circuit, 92 denotes an optical modulator package, 93 denotes an optical fiber amplifier, and 94 denotes a dispersion-shift optical fiber. The light emitted from the DFB (distributed feedback) laser 90 with a oscillation wavelength of 1.55 μm was modulated by the optical modulator package 92, amplified by the optical fiber amplifier 93, transmitted through the dispersion-shift optical fiber 94 (100 km), and received by a receiver. The error rate of the optical fiber transmission equipment was measured, and a good value of 10-12 or less was obtained.

Figure 4A:
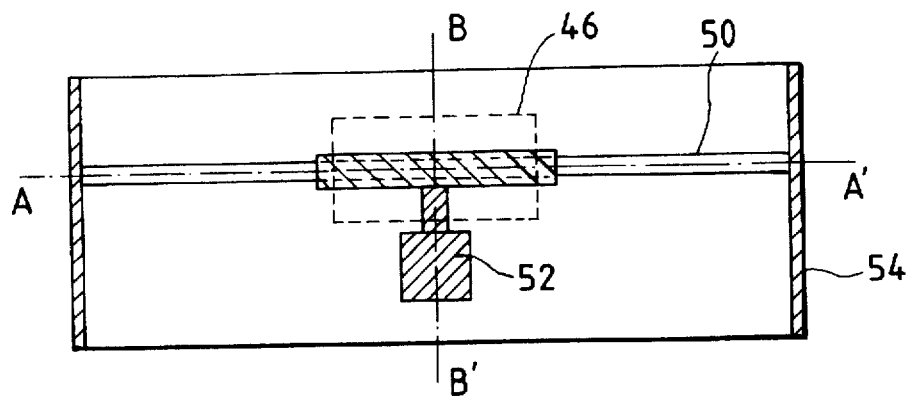
FIG. 4A is a top view of embodiment of the optical modulator of the present invention.
Figure 4B:
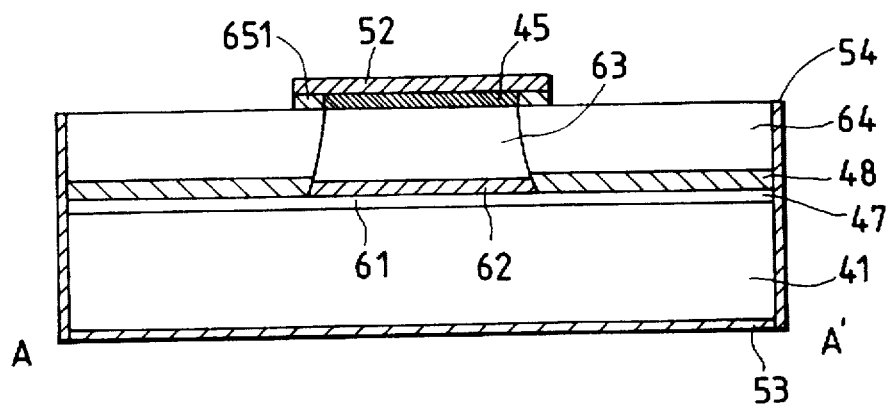
FIG. 4B is a sectional view along the line A—A' of FIG. 4A.
Figure 4C:
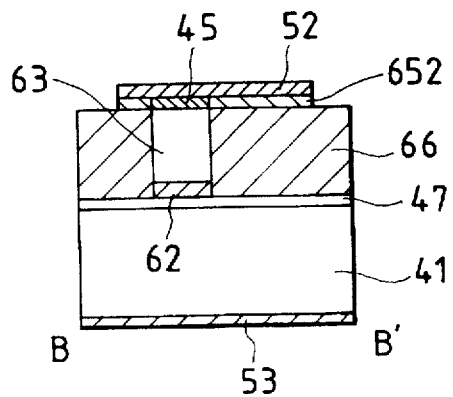
FIG. 4C is a sectional view along the line B—B+ of FIG. 4A.

FIG. 4A is a top view of the optical modulator of embodiment, and FIG. 4B is a sectional view taken along the line A—A' of FIG. 4A. The broken line 46 in FIG. 4A shows an SiO2 mask used for the etching and the second crystal growth. In FIGS. 4A and 4B, numeral 61 denotes an n-InP buffer layer, 62 denotes an undoped In GaAsP absorption layer, 63 denotes a p-InP cladding layer, 64 denotes an Fe-doped semi-insulating InP upper cladding layer, 651 and 652 denote n-InP cap layers, and 66 denotes an Fe-doped semi-insulating InP buried layer.

The n-InP buffer layer 61 (0.2 μm), undoped In$_{0.63}$Ga$_{0.37}$As$_{0.82}$P$_{0.18}$ absorption layer 62 (0.2 μm, band gap wavelength: 1.47 μm), p-InP cladding layer 63 (2.0 μm), and p+-In$_{0.53}$Ga$_{0.47}$As contact layer 45 (0.2 μm) were formed in order on the n-InP wafer 41 by MOCVD. Then, the contact layer 45, cladding layer 63, and absorption layer 62 other than the SiO$_2$ mask 46 were removed by selective wet etching using the SiO$_2$ mask 46. Then, the undoped In$_{0.82}$Ga$_{0.18}$As$_{0.40}$P$_{0.60}$ core layer 48 (0.2 μm), Fe-doped semi-insulating InP cladding layer 64 (2.0 μm), and n-InP cap layer 651 were formed in the region other than the SiO$_2$ mask 46 by MOCVD (Metal Organic Chemical Vapor Deposition). After the SiO$_2$ mask 46 was removed, etching is performed up to the InP wafer 41 by wet etching to form the optical waveguide 50 (waveguide width of 2 μm) and the waveguide was embedded with the Fe-doped InP 652 and n-InP 652. The Cr/Au p-electrode 52 was formed to partly remove the n-InP cap layers in the region other than the electrode. After the AuGeNi n-electrode 53 was vacuum-evaporated, the element was cleaved and the SiNx anti-reflection coats 54 were formed on both facets of the element. The element had an overall length of 1,000 μm, the modulation region has a length of 150 μm, and the element had a capacitance of 0.4 pF.

An optical modulator package was manufactured using the above optical modulator similarly to the first embodiment. The carrier protrusion width (W) was 1,000 μm similar to the first embodiment. The insertion loss of the obtained modulator was 6 dB, the modulation band was 15 GHz, and the voltage necessary for 15-dB extinction was 3.0 V.

An optical fiber transmission equipment like the first embodiment was fabricated using the optical modulator, and the transmission equipment demonstrated favorable performance with an error rate of $10^{-12}$ or less.

Figure 5A:
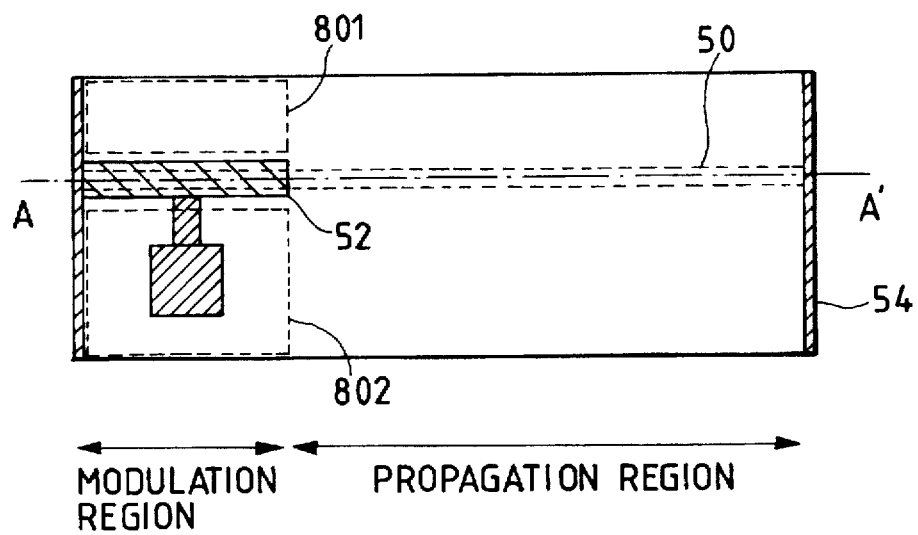
FIG. 5A is a top view of embodiment of the optical modulator of the present invention.
Figure 5B:
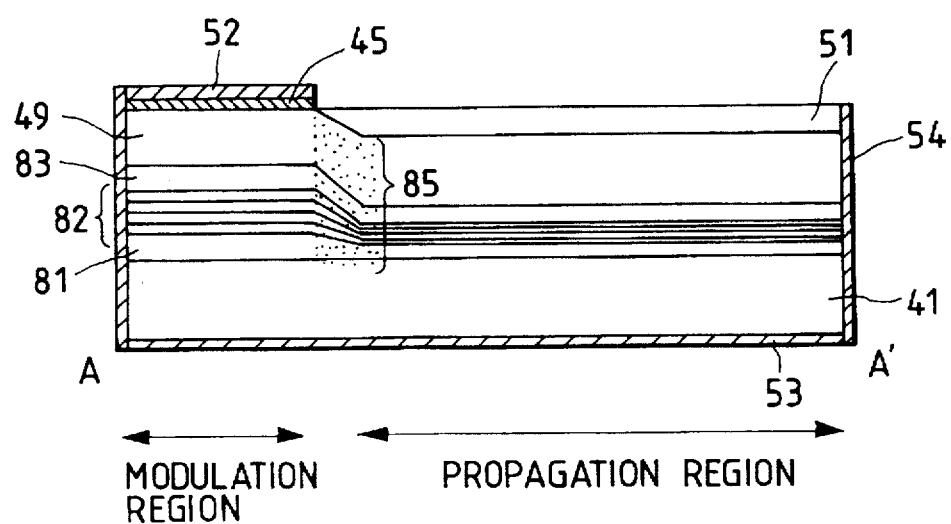
FIG. 5B is a sectional view along the line A—A' of FIG. 5A.

FIG. 5A is a top view of the optical modulator of embodiment, and FIG. 5B is a sectional view taken along the line A—A' of FIG. 5A. The broken lines in FIG. 5A show $SiO_2$ masks 801 and 802 used for crystal growth. In FIG. 5B, numeral 81 denotes an n-InGaAsP lower guiding layer, 82 denotes an InGaAs/InGaAsP multiple-quantum well layer, 83 denotes a p-InGaAsP upper guiding layer, 84 denotes a p-InP cladding layer, and 85 denotes proton implantation.

The $SiO_2$ masks 801 and 802 were provided on an n-InP wafer, and the n-$In_{0.82}Ga_{0.18}As_{0.40}P_{0.60}$ lower guiding layer 81 (0.15 μm), undoped $In_{0.53}Ga_{0.47}As/In_{0.82}Ga_{0.18}As_{0.40}P_{0.60}$ multiple-quantum well layer 82 (well layer: 4 nm, barrier layer: 7 nm, number of wells: 10, band gap wavelength: 1.45 μm), and p-$In_{0.82}Ga_{0.18}As_{0.40}P_{0.60}$ upper guiding layer 83 (0.15 μm) were selectively grown in the region other than the $SiO_2$ masks by MOCVD. In this case, in the modulation region sandwiched by the $SiO_2$ masks 801 and 802, the growth rate and mixed crystal composition were changed due to the material flowing from the tops of the masks, and the band gap wavelength of a multiple quantum well became larger than those of the passive regions. In the above case, however, the opening widths of the $SiO_2$ masks were adjusted so that the multiple quantum well band gap wavelength in the modulation region was 1.50 μm. After the $SiO_2$ masks 801 and 802 were removed, the p-InP cladding layer 49 (2.0 μm) and p+-$In_{0.53}Ga_{0.47}As$ contact layer 45 (0.2 μm) were formed on the entire surface of the wafer by MOCVD. A resist mask was placed on the light modulation region to partly remove the contact layer other than the light modulation region. Then, protons were implanted into the part between the modulation region and the passive region to insulate the passive-region cladding layer from the modulation-region cladding layer. Mesa-etching was performed up to the InP wafer 41 by dry etching to form the optical waveguide 50 (waveguide width of 3 μm), and thereafter planarized with polyimide 51 to form the Cr/Au p-electrode 52. After forming the AuGeNi n-electrode 53, the element was cleaved to form the SiNx anti-reflection coats 54 on both facets of the element. The element had an overall length of 800 μm and the modulation region had a length of 100 μm. The obtained element had a capacitance of 0.3 pF.

An optical module package was manufactured using the above optical modulator in the same manner as the first embodiment. The carrier width (W) was 800 μm. The insertion loss of the obtained optical modulator was 6 dB, the modulation band was 18 GHz, and the voltage necessary for 15 -dB extinction was 2.0 V.

An optical fiber transmission equipment similar to the first embodiment was made using the optical modulator, and the optical fiber transmission equipment demonstrated favorable performance with an error rate of $10^{-12}$ or less.

Though the invention was applied to only an electro-absorption-type intensity modulator, it will be obvious to one of ordinary skill in the art that the present invention can be generally applied to waveguide-type optical modulators (e.g. phase modulators).

By using the optical modulator of the present invention, it is possible to enhance the operating speed of an optical modulator package without deteriorating its thermal, high-frequency, and extinction characteristics. Consequently, operation of optical fiber transmission equipment can be speeded up by applying the optical modulator of the present invention and the optical modulator package to such optical fiber transmission equipment.

What is claimed is:

1. A semiconductor optical modulator comprising:
   a semiconductor wafer; and
   an optical waveguide formed on the semiconductor wafer, said optical waveguide including a modulation region for modulating light and a passive region for propagating light on at least one side of the modulation region, said passive region containing a core layer which is discontinuous with a core layer in said modulation region,
   wherein the core layer of said passive region is non-absorbent to incident light propagating through said waveguide and the core layer of said modulation region is absorbent to incident light propagating through said waveguide, with the core layers of said passive and modulation regions being made of materials selected to ensure that a low loss of light occurs in the core layer of the passive region.

2. The semiconductor optical modulator according to claim 1, wherein the modulation region of the optical waveguide has a length of less than 300 μm and the optical waveguide has an overall length of 300 μm or more.

3. The semiconductor optical modulator according to claim 1, wherein at least part of a cladding layer in the passive region of the semiconductor optical modulator is made of undoped semiconductor or semi-insulating semiconductor.

4. The semiconductor optical modulator according to claim 1, wherein the cladding layers in the passive region of the semiconductor optical modulator are electrically isolated from the cladding layer in the modulation region of the semiconductor optical modulator.

5. The semiconductor optical modulator according to claim 1, wherein light is modulated by use of the electro-absorption effect of semiconductor.

6. The semiconductor optical modulator according to claim 1, wherein at least part of the optical waveguide comprises a multiple-quantum well.

7. The semiconductor optical modulator according to claim 1, wherein at least part of the optical waveguide comprises a strained multiple-quantum well.

8. The semiconductor optical modulator according to claim 1, wherein a multilayer structure serving as an optical waveguide in the modulation region is provided on the entire surface of the wafer, at least part of the multilayer structure in the passive region being removed, and a multilayer structure constituting at least part of an optical waveguide in the passive region being formed in the passive region again.

9. The semiconductor optical modulator according to claim 1, wherein at least part of multilayer structures constituting the optical waveguides in the absorption and passive regions are simultaneously formed by selective-area growth with an insulating mask placed on the semiconductor.

10. The semiconductor optical modulator according to claim 1, wherein said wafer is formed from either a semiconductor doped with Fe or a semiconductor into which protons are implanted.

11. An optical modulator package using the semiconductor optical modulator of claim 1.

12. The optical modulator package according to claim 11, wherein a protrusion of a carrier on which a modulator is mounted has a width of 300 μm or more.

13. An optical fiber transmission equipment using the optical modulator package of either of claim 11 or claim 12.

14. A semiconductor optical modulator including an optical waveguide comprising:

a modulation region for modulating an incident light in response to an electro-absorption effect;

a passive region connected to one side of said modulation region along the direction of travel of the light for propagating the light, said modulation region being electrically isolated from said passive region; and means for applying an electric field to said modulation region in response to an electrical signal, wherein said modulation region includes a core layer and a cladding layer, and said passive region includes a core layer whose band gap energy is larger than the band gap energy of the core layer of said modulation region and a cladding layer made of different material from the cladding layer in said modulation region, with said modulation region being electrically isolated from said passive region.

15. A semiconductor optical modulator according to claim 14, wherein the modulation region of said optical waveguide has a length of less than 300 μm and said optical waveguide has an overall length of at least 300 μm.

16. A semiconductor optical modulation according to claim 14, wherein at least part of the cladding layer in said passive region is made of one selected from a group consisting of an undoped semiconductor and a semi-insulating semiconductor.

17. A semiconductor optical modulator including an optical waveguide comprising:

a modulation region for modulating an incident light in response to an electro-absorption effect;

a passive region connected to one side of said modulation region along the direction of travel of the light for propagating the light, said modulation region being electrically isolated from said passive region; and means for applying an electric field to said modulation region in response to an electrical signal, wherein said modulation region includes a core layer and a cladding layer with said core layer being formed of a multiple-quantum well, and said passive region includes a core layer whose band gap energy is larger than the band gap energy of said core layer of said modulation region and a cladding layer made of different material from the cladding layer in said modulation region.

18. A semiconductor optical modulator according to claim 17, wherein said multiple-quantum well is a strained multiple-quantum well.

19. A semiconductor optical modulator including an optical waveguide comprising:

a modulation region for modulating an incident light in response to an electro-absorption effect;

a passive region connected to both sides of said modulation region along the direction of travel of the light for propagating the light, said modulation region being electrically isolated from said passive region; and means for applying an electric field to said modulation region in response to an electrical signal, wherein said modulation region includes a core layer and a cladding layer, and said passive region includes a core layer whose band gap energy is larger than the band gap energy of the core layer of said modulation region and a cladding layer made of different material from the cladding layer in said modulation region.

20. A semiconductor optical modulator according to claim 19, wherein the modulation region of said optical waveguide has a length of less than 300 μm and said optical waveguide has an overall length of at least 300 μm.

21. A semiconductor optical modulation according to claim 19, wherein at least part of the cladding layer in said passive region is made of one selected from a group consisting of an undoped semiconductor and a semi-insulating semiconductor.

22. A semiconductor optical modulator including an optical waveguide comprising:

a modulation region for modulating an incident light in response to an electro-absorption effect;

a passive region connected to both sides of said modulation region along the direction of travel of the light for propagating the light, said modulation region being electrically isolated from said passive region; and means for applying an electric field to modulation region in response to an electrical signal, wherein said modulation region includes a core layer and a cladding layer with the core layer formed of a multiple-quantum well, and said passive region includes a core layer whose band gap energy is larger than the band gap energy of said core layer of said modulation region and a cladding layer made of different material from the cladding layer in said modulation region.

23. A semiconductor optical modulator according to claim 22, wherein said multiple-quantum well is a strained multiple-quantum well.

24. A semiconductor optical modulator including an optical waveguide comprising:

a modulation region for modulating an incident light in response to an electro-absorption effect;

a passive region connected to one side of said modulation region along the direction of travel of the light for propagating the light, said modulation region being electrically isolated from said passive region; and means for applying an electric field to the core layer of modulation region in response to an electrical signal, wherein said modulation region includes a core layer made of a multiple quantum well and a cladding layer, and said passive region includes a core layer made of a multiple-quantum well, a band gap energy of said passive region being larger than a band gap energy of the core layer of said modulation region, with the multiple-quantum well of said modulation region and the multiple-quantum well of said passive region being continuously formed.

25. A semiconductor optical modulator including an optical waveguide comprising:

a modulation region for modulating an incident light in response to an electro-absorption effect;

a passive region connected to both sides of said modulation region along the direction of travel of the light for propagating the light, said modulation region being electrically isolated from said passive region; and means for applying an electric field to the core layer of modulation region in response to an electrical signal, wherein said modulation region includes a core layer made of a multiple-quantum well and a cladding layer, and said passive region includes a core layer made of a multiple-quantum well, a band gap energy of said passive regions being larger than a band gap energy of the core layer of said modulation region, with the multiple-quantum well of said modulation region and the multiple-quantum well of said passive region being continuously formed.

26. An optical modulator package comprising:

a carrier; and an optical modulator fabricated above said carrier, wherein a protrusion width of said carrier is of a size almost equal to an overall size of the optical modulator, input/output electrical terminal pins are connected to said optical modulator, and optical fibers are connected to both sides of said optical modulator along the direction of travel of an incident light, and wherein said optical modulator includes:

an optical waveguide including a modulation region for modulating an incident light in response to an electro-absorption effect, and a passive region connected to one side or both sides of said modulation regions along the direction of travel of the light for propagating the light, with said modulation region being electrically isolated from said passive region, and means for applying an electric field to said modulation region in response to an electrical signal, wherein said modulation region includes a core layer and a cladding layer, and said passive region includes a core layer whose band gap energy is larger than the band gap energy of the core layer of said modulation region and a cladding layer made of different material from the cladding layer in said modulation region.

27. An optical modulator package comprising:

a carrier; and an optical modulator fabricated above said carrier, wherein a protrusion width of said carrier is of a size almost equal to an overall size of the optical modulator, input/output electrical terminal pins are connected to said optical modulator, optical fibers are connected to both sides of said optical modulator along the direction of travel of an incident light, and wherein said optical modulator includes:

an optical waveguide including a modulation region for modulating an incident light in response to an electro-absorption effect, a passive region connected to one side or both sides of said modulation region along the direction of travel of the light for propagating the light, with said modulation region is electrically isolated from said passive region, and means for applying an electric field to the core layer of modulation region in response to an electrical signal, wherein said modulation region includes a core layer made of a multiple quantum well and a cladding layer, and said passive region includes a core layer made of a multiple-quantum well, a band gap energy of said passive regions being larger than a band gap energy of the core layer of said modulation region, and with both of multiple-quantum wells of said modulation region and said passive regions being continuously formed.

28. An optical modulator package according to claim 27, wherein the protrusion of the carrier has a width of at least 300 μm.

29. An optical fiber transmission equipment comprising:

a light emitting means;

an optical modulator driving circuit, coupled to said light emitting means, for transmitting data; and the optical modulator package set forth in claims 26, 27, or 28.

* * * * *